US007813846B2

(12) United States Patent
Wills et al.

(10) Patent No.: US 7,813,846 B2
(45) Date of Patent: Oct. 12, 2010

(54) SYSTEM AND METHOD FOR RAILYARD PLANNING

(75) Inventors: Mitchell Scott Wills, Melbourne, FL (US); Srinivas Bollapragada, Niskayuna, NY (US); Joanne Maceo, Rockledge, FL (US); Prescott H. Logan, Satellite Beach, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/374,012

(22) Filed: Mar. 14, 2006

(65) Prior Publication Data

US 2007/0005200 A1    Jan. 4, 2007

Related U.S. Application Data

(60) Provisional application No. 60/661,008, filed on Mar. 14, 2005.

(51) Int. Cl.
*G06F 7/00* (2006.01)
*G06F 17/00* (2006.01)
*B61B 1/00* (2006.01)
*B61L 27/00* (2006.01)

(52) U.S. Cl. .................. 701/19; 701/117; 246/2 R; 104/26.1

(58) Field of Classification Search ............... 701/19, 701/117; 246/2 R; 104/26.1
See application file for complete search history.

(56) References Cited

U.S. PATENT DOCUMENTS

| 3,575,594 A | 4/1971 | Elcan |
| 3,734,433 A | 5/1973 | Metzner |
| 3,794,834 A | 2/1974 | Auer, Jr. et al. |
| 3,839,964 A | 10/1974 | Gayot |
| 3,895,584 A | 7/1975 | Paddison |
| 3,944,986 A | 3/1976 | Staples |

(Continued)

FOREIGN PATENT DOCUMENTS

| CA | 2057039 | 12/1990 |
| CA | 2066739 | 2/1992 |
| CA | 2046984 | 6/1992 |
| CA | 2112302 | 6/1994 |
| CA | 2158355 | 10/1994 |

(Continued)

OTHER PUBLICATIONS

Crone et al., "Distributed Intelligent Network Management for the SDI Ground Network," IEEE, 1991, pp. 722-726, MILCOM '91.

(Continued)

*Primary Examiner*—Jack Keith
*Assistant Examiner*—Chuong P Nguyen
(74) *Attorney, Agent, or Firm*—Duane Morris LLP

(57) ABSTRACT

A system and method for generating a computer-aided rail yard plan for the movement of plural railcars through a rail yard, the rail yard having tracks that are used as receiving tracks, classification tracks and departure tracks and the plural railcars arriving on inbound trains and departing on outbound trains, the plural railcars required to undergo a sequence of tasks to move through the rail yard, the yard plan providing (a) a schedule for receiving trains, (b) a schedule for inspecting cars on receiving tracks, (c) a schedule for humping cars from receiving tracks into classification tracks, (d) a schedule for pulling trains onto departure tracks, (e) a schedule for testing trains, and (f) a schedule for departing trains.

24 Claims, 2 Drawing Sheets

U.S. PATENT DOCUMENTS

| | | | |
|---|---|---|---|
| 4,099,707 A | 7/1978 | Anderson | |
| 4,122,523 A | 10/1978 | Morse et al. | |
| 4,361,300 A | 11/1982 | Rush | |
| 4,361,301 A | 11/1982 | Rush | |
| 4,610,206 A * | 9/1986 | Kubala et al. | 104/26.1 |
| 4,669,047 A | 5/1987 | Chucta | |
| 4,791,871 A | 12/1988 | Mowll | |
| 4,843,575 A | 6/1989 | Crane | |
| 4,883,245 A | 11/1989 | Erickson, Jr. | |
| 4,926,343 A | 5/1990 | Tsuruta et al. | |
| 4,937,743 A | 6/1990 | Rassman et al. | |
| 5,038,290 A | 8/1991 | Minami | |
| 5,063,506 A | 11/1991 | Brockwell et al. | |
| 5,177,684 A | 1/1993 | Harker et al. | |
| 5,222,192 A | 6/1993 | Shafer | |
| 5,229,948 A | 7/1993 | Wei et al. | |
| 5,237,497 A | 8/1993 | Sitarski | |
| 5,265,006 A | 11/1993 | Asthana et al. | |
| 5,289,563 A | 2/1994 | Nomoto et al. | |
| 5,311,438 A | 5/1994 | Sellers et al. | |
| 5,331,545 A | 7/1994 | Yajima et al. | |
| 5,332,180 A | 7/1994 | Peterson et al. | |
| 5,335,180 A | 8/1994 | Takahashi et al. | |
| 5,365,516 A | 11/1994 | Jandrell | |
| 5,390,880 A | 2/1995 | Fukawa et al. | |
| 5,420,883 A | 5/1995 | Swensen et al. | |
| 5,437,422 A | 8/1995 | Newman | |
| 5,463,552 A | 10/1995 | Wilson et al. | |
| 5,467,268 A | 11/1995 | Sisley et al. | |
| 5,487,516 A | 1/1996 | Murata et al. | |
| 5,541,848 A | 7/1996 | McCormack et al. | |
| 5,623,413 A | 4/1997 | Matheson et al. | |
| 5,745,735 A | 4/1998 | Cohn et al. | |
| 5,794,172 A | 8/1998 | Matheson et al. | |
| 5,823,481 A | 10/1998 | Gottschlich | |
| 5,825,660 A | 10/1998 | Cagan et al. | |
| 5,828,979 A | 10/1998 | Polivka et al. | |
| 5,850,617 A | 12/1998 | Libby | |
| 6,032,905 A | 3/2000 | Haynie | |
| 6,115,700 A | 9/2000 | Ferkinhoff et al. | |
| 6,125,311 A | 9/2000 | Lo | |
| 6,144,901 A | 11/2000 | Nickles et al. | |
| 6,154,735 A | 11/2000 | Crone | |
| 6,250,590 B1 | 6/2001 | Hofestadt et al. | |
| 6,351,697 B1 | 2/2002 | Baker | |
| 6,377,877 B1 | 4/2002 | Doner | |
| 6,393,362 B1 | 5/2002 | Burns | |
| 6,405,186 B1 | 6/2002 | Fabre et al. | |
| 6,418,854 B1 * | 7/2002 | Kraft | 104/26.1 |
| 6,437,705 B1 * | 8/2002 | Barich et al. | 340/907 |
| 6,459,965 B1 | 10/2002 | Polivka et al. | |
| 6,516,727 B2 * | 2/2003 | Kraft | 104/26.1 |
| 6,587,738 B1 * | 7/2003 | Belcea | 700/33 |
| 6,587,764 B2 | 7/2003 | Nickles et al. | |
| 6,637,703 B2 | 10/2003 | Matheson et al. | |
| 6,654,682 B2 | 11/2003 | Kane et al. | |
| 6,766,228 B2 | 7/2004 | Chirescu | |
| 6,789,005 B2 | 9/2004 | Hawthorne | |
| 6,799,097 B2 | 9/2004 | Villarreal Antelo | |
| 6,799,100 B2 | 9/2004 | Burns | |
| 6,832,204 B1 * | 12/2004 | Doner | 705/8 |
| 6,853,889 B2 | 2/2005 | Cole | |
| 6,856,865 B2 | 2/2005 | Hawthorne | |
| 6,961,682 B2 * | 11/2005 | Doner | 703/2 |
| 7,006,796 B1 | 2/2006 | Hofmann et al. | |
| 7,006,957 B2 * | 2/2006 | Doner | 703/6 |
| 7,657,348 B2 * | 2/2010 | Muinonen et al. | 701/19 |
| 2001/0034642 A1 * | 10/2001 | Doner | 705/13 |
| 2002/0082814 A1 * | 6/2002 | Doner | 703/6 |
| 2003/0105561 A1 | 6/2003 | Nickles et al. | |
| 2003/0183729 A1 | 10/2003 | Root et al. | |
| 2003/0225600 A1 * | 12/2003 | Slivka et al. | 705/5 |
| 2004/0010432 A1 | 1/2004 | Matheson et al. | |
| 2004/0034556 A1 | 2/2004 | Matheson et al. | |
| 2004/0093196 A1 | 5/2004 | Hawthorne | |
| 2004/0093245 A1 | 5/2004 | Matheson et al. | |
| 2004/0267415 A1 | 12/2004 | Lacote et al. | |
| 2005/0107890 A1 | 5/2005 | Minkowitz et al. | |
| 2005/0192720 A1 | 9/2005 | Christie et al. | |
| 2006/0074544 A1 | 4/2006 | Morariu et al. | |

FOREIGN PATENT DOCUMENTS

| | | |
|---|---|---|
| EP | 0108363 | 5/1984 |
| EP | 0193207 | 9/1986 |
| EP | 0341826 | 11/1989 |
| EP | 0554983 | 8/1993 |
| FR | 2692542 | 12/1993 |
| GB | 1321053 | 6/1973 |
| GB | 1321054 | 6/1973 |
| JP | 3213459 | 9/1991 |
| WO | WO 90/03622 | 4/1990 |
| WO | WO 93/15946 | 8/1993 |

OTHER PUBLICATIONS

Ghedira, "Distributed Simulated Re-Annealing for Dynamic Constraint Satisfaction Problems," IEEE 1994, pp. 601-607.

Hasselfield, et al., "An Automated Method for Least Cost Distribution Planning," IEEE Transactions on Power Delivery, vol. 5, No. 2, Apr. 1990, 1188-1194.

Herault, et al., "Figure-Ground Discrimination: A Combinatorial Optimization Approach," IEEE Transactions on Pattern Analysis & Machine Intelligence, vol. 15, No. 9, Sep. 1993, 899-914.

Igarashi, "An Estimation of Parameters in an Energy Fen Used in a Simulated Annealing Method," IEEE, 1992, pp. IV-180-IV-485.

Komaya, "A New Simulation Method and its Application to Knowledge-based Systems for Railway Scheduling," May 1991, pp. 59-66.

Puget, "Object Oriented Constraint Programming for Transportation Problems," IEEE 1993, pp. 1-13.

Sasaki, et al., "Development for a New Electronic Blocking System," QR of RTRI, vol. 30, No. 4, Nov. 1989, pp. 198-201.

Scherer, et al., "Combinatorial Optimization for Spacecraft Scheduling," 1992 IEEE International Conference on Tolls with AI, Nov. 1992, pp. 120-126.

Watanabe, et al., "Moving Block System with Continuous Train Detection Utilizing Train Shunting Impedance of Track Circuit," QR of RTRI, vol. 30, No. 4, Nov. 1989, pp. 190-197.

* cited by examiner

SYSTEM AND METHOD FOR RAILYARD PLANNING

This application claims the benefit of U.S. Provisional Application No. 60/661,008, filed Mar. 14, 2005, the disclosure of which is hereby incorporated by reference.

The present disclosure is directed to the planning of operations for a rail yard in order to optimize the performance of the rail yard and to interface the automated planning of the rail yard with the automated planning of the line of road.

In North America, the main competitor against the rail industry is the trucking industry. The most significant hurdles for the rail industry in capturing more of the North Atlantic market are reducing transit time and reducing transit time variability. Rail yard operations are central to any effort to reduce transit time and transit time variability. Rail yards account for upwards of fifty percent of total car transit time and transit time variation. Typically, thirty five to fifty percent of all carloads endure one or more yard-based switch events per trip. For the remaining carloads, mainline fluidity is contingent upon yards receiving and departing trains as scheduled. As a result, on-time train departure performance is approximately forty to eighty percent and car connection performance is approximately thirty to seventy percent. These levels of performance typically result from a lack of coordination among yard activities. Poor planning is endemic in the yard because of the inherent complexity of the equation that the planner is attempting to solve in order to perfectly synchronize the operation. Because of his limitations, the planner typically reaches a sub optimal solution, which results in poor utilization of yard resources and ultimately underperformance (relative to some theoretical capability). The nature of yard operations, i.e. a highly variable inflow and the occurrence of catastrophic events, makes planning more difficult some days than others. Also, there is significant variability in each yardmaster's ability to solve the planning equation.

A rail yard consists of a number of sub yards with each sub yard designed to perform specific tasks. Before a train enters a rail yard, the train is typically under the control of a network movement plan generated by a line-of-road planner and executed by a dispatcher. As the train enters the rail yard, the responsibility for the movement of the train is passed from the dispatcher to rail yard personal. The rail yard personal will control the movement of the train pursuant to a rail yard movement plan. The rail yard movement plan is different than the line of road movement plan in that the line of road movement plan considers a train as a single entity and plans the use of resources to move the train without conflict through the rail network. In the rail yard, the train consist will be divided into individual cars and thus the rail yard movement plan must account for the individual movement of each of the cars and locomotive until a reconstituted train having different cars is released from the rail yard to the line of road movement planner. Typically, the movement plan for the rail yard had been generated manually to take into account the various services and resources that are required to process the incoming cars.

One typical configuration of a rail yard includes a receiving yard for receiving a train from a network of tracks. The receiving yard includes one or more sets of track to receive a train from the line of road tracks and permit rail yard personal to inspect the train. The locomotives are detached from the railcars and further inspection and maintenance is accomplished. Rail cars are then moved form the receiving yard to classification tracks. The railcars are classified in blocks of common destination. The classification yard can be either a flat-switched classification yard (requiring a motive force) or a hump yard. The hump yard typically includes a hill which feeds into a set of classification tracks to allow individual rail cars to be gravity fed to the appropriate classification track as a function of the destination of the railcar. Cars having a common destination are fed to a common track. A series of switches down stream of the hump control the track to which the car is routed. Once the railcars are classified in blocks, they are moved as blocks to the departure yard. The departure yard master directs each block to a departure track based on its subsequent destinations. At the departure yard the cars are inspected and the train consist is brake tested and powered up and prepared for release to the network of line of road track under control of the dispatcher. Although larger yards may have dedicated tracks used for receiving, classifying and departing railcars and trains, some yards use common tracks to perform the required tasks and do not have tracks dedicated to a specific purpose, e.g., common tracks are used for receiving and classifying.

Typically, the scheduling of train movement in the yard is largely a manual effort including (a) estimating train arrival time by conferencing with line-of-road operations management officials, (b) negotiating between line-of-road and yard officials about the time at which each train will be accepted by the yard, (c) allocating a set of receiving tracks to an inbound train based on intuition and static business rules communicated by word of mouth, (d) assigning workers to inbound car inspection tasks, reporting completion of inspection tasks, and requesting new assignments by physically reporting to the responsible yard manager, in-person, or by radio, (e) selecting a track or tracks to combine and hump, (i) communicating humping tasks to the hump engine crew in-person, or via radio, (g) coupling and pulling selected cars to the hump approach lead, (h) shoving selected cars over the hump at a prescribed rate, (i) planning trim and pull-down operations to move the classified car blocks from their classification tracks to the departure tracks in preparation for departure, (j) manually communicating trim and pull-down assignments to switch engine crews, in-person or via radio, (k) reporting completion of trim and pull-down assignments, in-person or via radio, (l) scheduling power and crew assignments to each outbound train, (m) assigning workers to outbound car inspection and departure preparation tasks, reporting completion of inspection tasks, and requesting new assignments by physically reporting to the responsible yard manager, in-person, or by radio, and (n) adjusting departure time estimates based on reported, estimated and/or actual resource availability times (e.g. crew and engine), and task completion times. Because many of these tasks are performed by yard personnel who report to the yard master only upon completion of their assigned task, a common problem is the excessive dwell time of the rail cars while waiting for the required tasks of inspecting and servicing to be completed by yard personnel.

The present application is directed to an automated yard planner which automated many of the above tasks resulting in a yard plan that maximizes the yard's business objectives such as minimizing dwell time, maximizing throughput, minimizing costs, etc in order to optimize the yard's performance that was not previously available.

DETAILED DESCRIPTION

Figure 1:
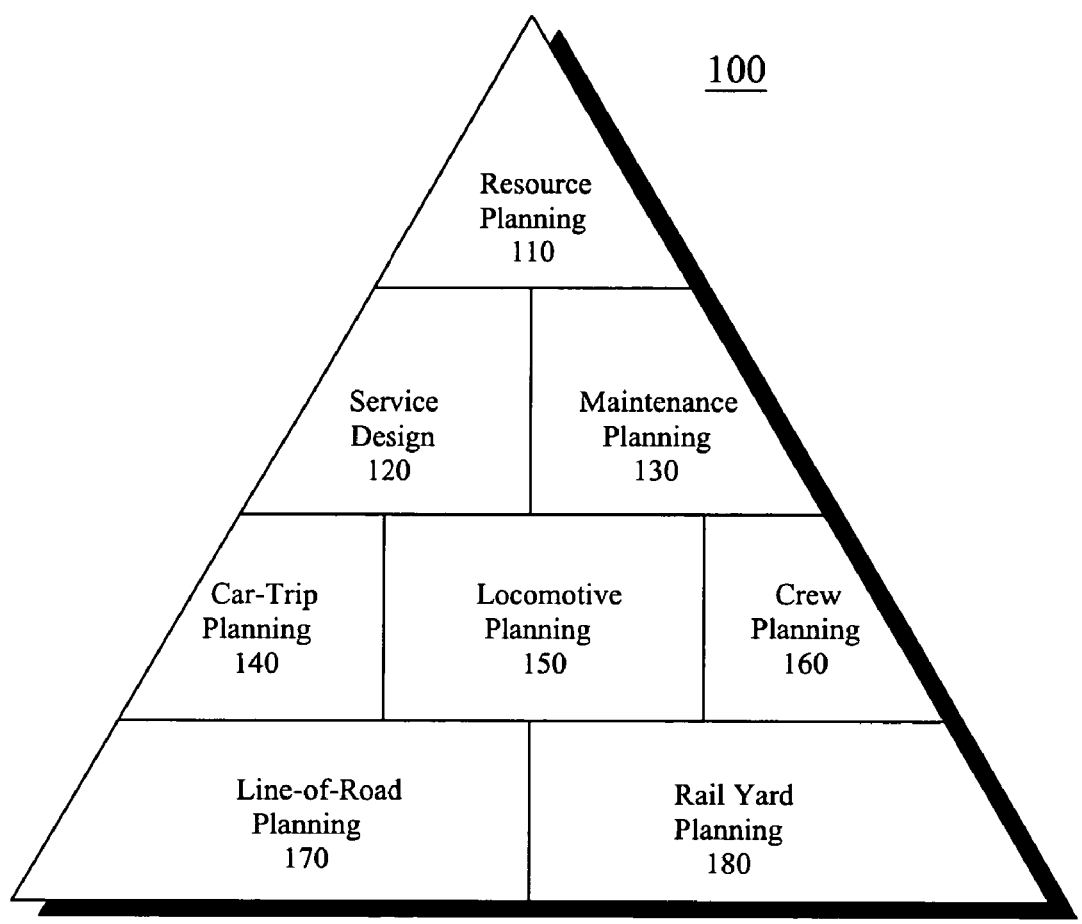
FIG. 1 is a simplified pictorial representation of a railway control and management hierarchy.

With reference to FIG. 1, a typical hierarchical rail system planning architecture 100 is illustrated. At the top level of the hierarchy on a typical railroad, resource planning 110 may occur annually, addressing for example what trackage should be added or retired, what yards to operate, and how many new locomotives will be needed over the course of the year. Strategic planning occurs every few years, determining the network blocking plan and train schedules that will operate, to accommodate expected demand, with weekly and seasonal variations based on the service design 120 and the maintenance planning 130. Daily, car-trips are planned to satisfy individual customer orders 140, locomotives are assigned to individual trains in accordance with a locomotive movement plan balancing the flow of locomotives into and out of the locations where they will be required 150 and crews are assigned in accordance with pool rotation and labor agreements 160. Minute by minute, line-of-road 170 and yard operations 180 plan and execute the train and car movements and myriad support functions to realize the network operating goals.

Today, at all levels in the hierarchy, the degree of automation varies by location. This is particularly true of higher-level car trip planning functions, which are often performed manually with the aid of various offline simulation tools, and in the yard where little or no computer aided operations management is available.

The present application is directed to providing computer-aided operations management to the yard planning process. The yard planner may be a distributed agent, responsible for a single yard, or may be responsible for multiple yards. The yard planner's design may facilitate manual input as well as automated message input of car connection goals, and car value functions as well as yard production status and resource constraints.

Planning car movements in the yard through the present disclosure requires an awareness of the current and planned future state of the status of the yard resources including (a) yard inventory for the receiving, classification and departing yards; (b) the current state and immediate operating plans for each yard function including receiving inspection, car classification, switching movements, coupling/spacing cars, building outbound trains, departure inspection, air testing and hostling; (c) the current and available yard crews allocable to each function; (d) the current and available locomotives and crews allocable to each function; (e) scheduled outbound train departures; (f) available road power and rested road crews; (g) scheduled inbound trains; (h) local industry service request including pickups, setouts and spotting cars; and (i) expedited car blocks and must make connections. In addition, in one embodiment of the present disclosure, the yard planning system is aware of the line of road situation and automatically receives information relating to congestion, blockages, delayed departure requests and early/late arrival plans. The yard planner may also provide feedback to the line of road planner regarding yard fullness vs. capacity, desired inbound spacing, desired inbound train arrival track, predicted ready for departure time updates and planned outbound train departure lead. The yard planner may also take into account customer service operating metrics such as on-time arrival performance of loads and empties at customer dock, on-time pickup of loads and empties from customer dock. In one embodiment, the yard planner provides customer service progress visibility including real-time web based status updates other customer.

In one embodiment of the present invention, the yard planner generates a yard-level car movement plan that provides a detailed schedule, including time and resources, for the movement and processing of each car through the yard during the planning horizon. The yard plan is optimized according to a set of business objectives that satisfy the network-operating plan while maximizing efficiency of yard-level operations.

Business objectives can be initially taken as car connection performance plus on-time delivery performance extrapolated to the customer's dock, minus operating cost. Extrapolation involves estimating the duration of the remaining journey to each car's destination, adding this to the planned departure time from the yard, and evaluating the net impact to on-time delivery of the car (loaded or empty) to the customer's location. In the absence of extrapolation data, delivery performance can be approximated by on-time departure performance.

Operating cost may be the sum of the relative cost of each planned car processing task. For example, the cost of pulling the lead car(s) from a track may be assigned a relative cost of one (1), while the cost of pulling a buried (cut of) car(s) may have a relative cost of three (3), representing the cost to remove the cars obstructing the desired car(s), then pull the desired car(s), and finally replace the formerly obstructing cars.

Alternate objectives for consideration include maximum yard throughput, yard resource utilization, terminal car dwell and robustness (tolerance and recovery for yard anomalies). Inputs for each car include estimated arrival time, position within inbound train, scheduled departure time, scheduled outbound train, connection value function, on-time performance value function, final customer, positional constraints in the outbound train (desired standing order based on destination and/or train-building rules), and bad order status.

Detailed knowledge of the processing constraints associated with the yard plant can be represented in a yard planning database, including current car inventory (number, location, car block distribution), production status, historical processing rate and capacity by process step, congestion-dependent and, time-dependent variation of yard process performance, available yard crews by type, available switch locomotives.

Maintenance schedules and fluidity of outbound routes are also a consideration. Maintenance schedules can be input as diminished resource availability over the affected time. Outbound route congestion can be represented via a peer-to-peer message interface to the line-of-road planning system. Congestion metrics are to be determined, possibly including nominal delay by train group and as an aggregate, train density (trains per mile), and planned track blockages.

Car trip plans are a primary input to the yard planner. Car trip plans include the origin and destination, as well as a list of yards the car will visit and the specific train (SCAC, Symbol, Section, and Train Origin Date) the car is planned to ride on each leg of its journey. As the car trip plans are constructed, target arrival times and car value can be specified in terms of connection performance and on-time arrival performance. These connection goals and car value functions guide the yard planner to optimize execution of the network transportation plan, while maximizing efficiency of yard-level operations.

Connection performance is a function of the rolled-throughput yield of the yard plant model. For a given car at any point in time, the probability of making a connection with an outbound train is described by a connection-success probability distribution as a function of the time remaining until train departure. The variance of this process is proportional to the sum of the variances of each process step in the car's journey through the yard. The rolled-throughput yield may be referred to as will be referred to as $P_{MAKE}$, or the probability of making a connection as a function of the time remaining until train departure. This process characterization will be used to identify candidate cars for each outbound train.

Detailed car movements and car processing activities within the yard are planned so as to maximize connection goals, subject to available resources (yard crews, yard track, and yard engines). As congestion increases or as anomalies occur, not all connections will be achievable. Car value functions express the "dynamic priority" of each car block, allowing the yard planner to evaluate the relative cost of delaying or advancing each car.

$$\text{Total Plan Value} = a \times (\text{Sum of Connection Value Function}) + b \times (\text{Sum of On-Time Arrival Value Function}) - c \times (\text{Sum of Relative Operating Cost})$$

Conceptually, configuring coefficients "a", "b" and "c" has the effect of weighting the optimization more toward connection performance or toward on-time delivery, or toward operating cost, or as a balance between the three. Connection performance scores a car-specific constant value if its connection is made and a separate (possibly zero) value if the connection is missed. On-Time performance is a piecewise linear function of the extrapolated estimate of arrival time at the customer's dock, subtracted from the promised delivery time. For simplicity, on-time delivery may be approximated as on-time departure, until such time that down line transit time and congestion metrics are available. Processing cost is a relative measure of the cost of operations prescribed for a car. For example, pulling a buried car from within a cut of cars standing on a track might be three times the cost of pulling the lead car(s) from the same track (assuming the obstructing cars must be removed, the desired cars pulled, and the formerly obstructing cars replaced). If the plan can arrange to place cars on the classification tracks in the order that they will be needed, overall cost is reduced.

The sequence of activities performed on each car as it passes through the yard are represented as a set of resource reservation and dependency rules, allowing configuration of the general flow of yard plant operations, as well as specific track (and other resource) reservations required in each step. Site-specific business rules and unusual dependencies among required resources can be configured as a part of the rule base.

Rules for building individual train groups, by car block, class-of-service and destination can be configured to characterize the strategies unique to a specific terminal or yard. Car blocks are generally organized in a standing order that places nearest the engine those cars to be set out first. Other train make-up constraints will be configurable by individual yard (e.g. required positioning within the train consist for hazardous material and key train cars, long and short cars, loaded and empty cars, speed-restricted cars, excess dimension cars, expedited car blocks)

The resulting yard plan provides a detailed schedule, including time and departure tracks, for the movement of each car through the yard during a predetermined planning horizon. Subordinate resource planners translate the plan in to measurable tasks assigned to individuals, while monitoring their progress in a periodic closed-loop planning cycle.

The process of moving cars through the yard can be modeled as a sequence of activities requiring exclusive use of particular, limited resources. The plan consists of the sequence of car movement operations and the resource reservations necessary to accomplish them.

The yard planner generates a yard plan covering a period known as the planning horizon. At regular intervals, a new yard plan is generated to account for schedule deviations, yard processing rate changes, and extra trains. The new yard plan once again extends into the future according to the planning horizon; a concept known as a rolling horizon. A new yard plan is based on the state of the yard at the time that a new plan is initiated. This state includes projected arrival and departure schedules, yard resource levels, the current car inventory (including number, location, and block designations), and track geometry. The yard planner will adjust the resulting yard plan to assure that it is compatible with the current state before it is presented as the recommended yard plan. A yardmaster, yard manager or other authorized user may can review, revise or reject a recommended yard plan before it becomes the operational plan. In one embodiment, the general flow of the planning process begins with an enumeration of the outbound trains scheduled to depart the yard in the planning horizon. For each outbound train, candidate cars are identified as those cars in blocks assigned to that train. Each car has a business objective value associated with it. The business objective value may take into account (a) satisfying outbound train make-up rules, such as length, weight, standing order, and (b) satisfying yard operating rules, such as static/dynamic track assignments, (c) satisfying available resources, (d) optimizing business objectives, and (e) minimizing yard operating cost such as by minimizing the number and cost of moves by each yard resource. The respective business objective value for each car can be weighted as a function of the probability of the car making the target connection of an outbound train. Alternately, candidate cars for an outbound train can be selected as a function of the probability of the making the target outbound train exceeding some predetermined value, i.e., 50% or greater. For each candidate car, the resource requirements are identified and a sequence of tasks necessary to place car in the outbound consist. Next the sequence of resources and tasks for a subset of the candidate cars are scheduled. Finally specific resources are assigned to each task.

The probability that a car will make its target outbound connection may be determined using a number of methods including (a) by evaluating the historical performance of the railcars to make a connection, (b) by using a time based modulation function, i.e., one that considers one of time of day and time of season, and (c) by using a load based modulation function.

Figure 2:
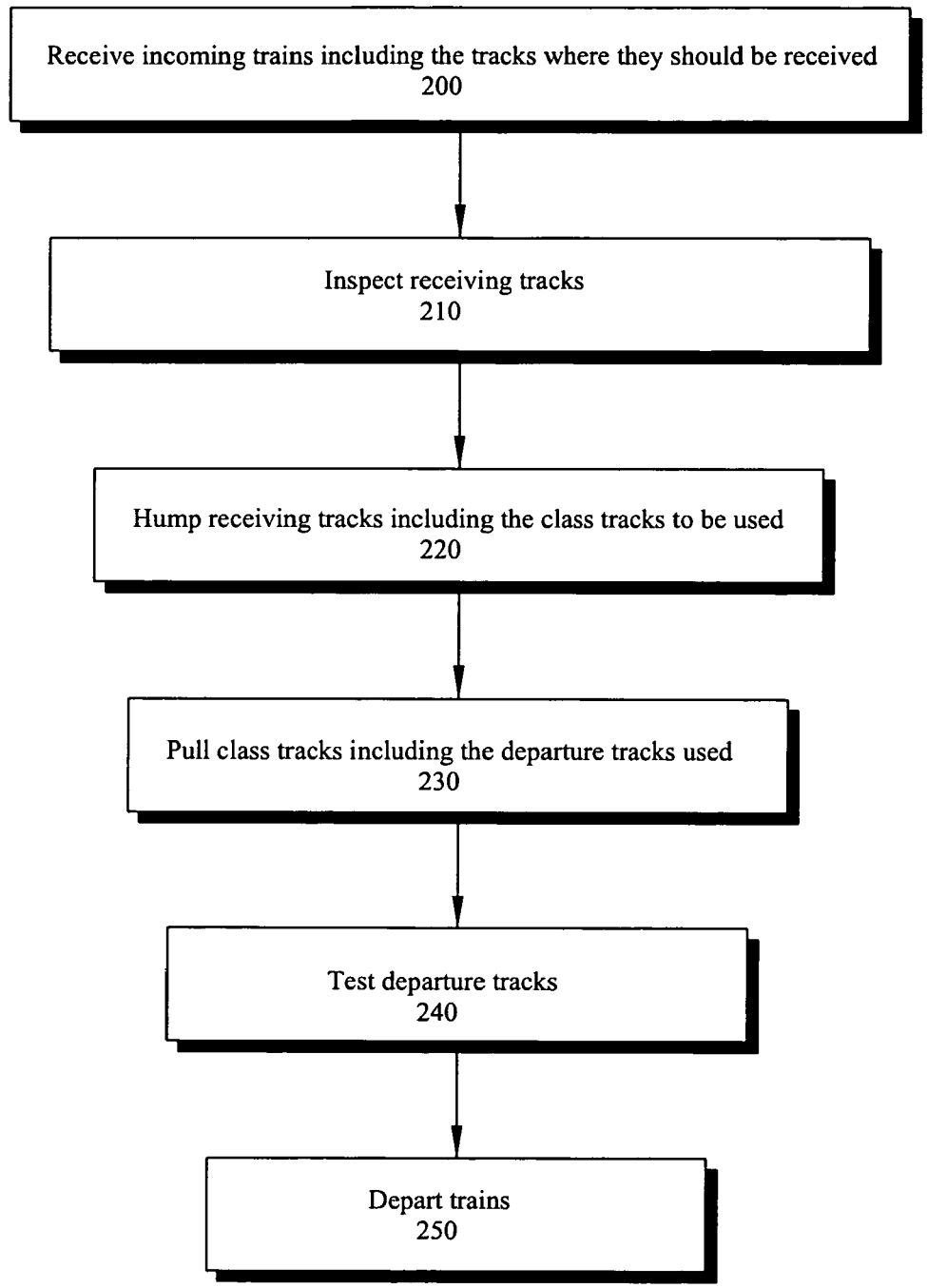
FIG. 2 is a simplified flow chart of one embodiment of a yard planner according to the present disclosure.

In another embodiment, metric evaluation and analysis is used at each sequential process as a car traverses the yard. FIG. 2 illustrates a simplified, sequential process of creating a yard plan during one periodic cycle. The yard is assumed quiescent, with some cars in each sub-yard at various phases of yard processing. Simple rules mimicking human decision-making processes are used to determine what cars should be moved at each step. True optimization is not achieved, but a favorable result can be achieved for normal operations. When a feasible plan cannot be found (usually due to an incomplete rule base) human intervention is solicited, highlighting the unresolved conflicts, to draw his attention to where it is needed.

Based on the current yard state the following steps are performed. Incoming trains are received on the tracks where they should be received 200. The trains are inspected on the receiving tracks 210. The locomotives are decoupled and the rail cars, individually or as blocks, are humped to the classification tracks 220. As the cars are assembled on the classification tracks, blocks of cars are moved to the departure tracks 230. At the departure tracks the train blocks are inspected 240 and locomotives are added. If the train is too long to fit in a single departure track, the train must double-out, a final brake test is performed and the trains depart 250.

The step of receiving the incoming trains 200 includes computing the available capacity of the receiving yard. In one embodiment each train that is scheduled to be received within a predetermined period of time is evaluated to identify the train with the earliest arrival tie that fits in the receiving yard. Once a train is identified, the receiving yard is searched to determine the best receiving tracks to receive the train. In one embodiment, the goal may be to receive the train on as few as tracks as possible. If the train requires more than one receiving track, the tracks should be chosen to be as close to one another as possible.

The step of inspecting the cars on the receiving track 210 includes evaluating the cars on each receiving track to determine a measure of importance for each car. A measure of importance can be any metric which is used to determine the relative importance of the rail cars and can include consideration of qualitative or quantitative factors. For example, the measure of importance may be based on priority of the car, or the probability of the car to make a connection. In one embodiment, the measure of importance is determined as a function of the consist of the received train. For example, a consist containing a car that has high priority and incurs large penalties if delayed would greatly influence the importance of the cars on that track. In another embodiment, the measure of importance is determined as a function of the scheduled departure times of the outbound trains containing the cars on the receiving track. In yet another embodiment, the measure of importance is determined as a function of the minimum amount of time needed for the cars to make an outbound connection. Once the measure of importance for each car is determined, the receiving track having the highest cumulative measure of importance for all the cars on its track is inspected first. Planned inbound train consist is viewed as expected future car inventory. Profiled inspection and inbound processing times are budgeted to anticipate when the cars will be available to be classified.

The step of humping a receiving track 220 includes determining a measure of importance for each car on all receiving tracks that have already been inspected. The measure of importance can be determined by evaluating the same factors as discussed above, i.e., consist, departure time or time needed to make outbound connection, or it may consider other factors such as car dwell time. Once the measure of importance of each car that has been inspected is determined, the tracks containing the cars are sorted in decreasing order of cumulative importance. In one embodiment, the classification tracks are evaluated to identify which classification track is available to receive the cars from the highest sorted receiving track while maintaining pure blocks of cars.

The classification tracks of the cars of the highest sorted track are then identified and cars are humped to their respective classification track. A goal is to ensure that blocks for an outbound train are in the same class track group. In one embodiment, for each car on the receiving track being considered, if there is space available on a classification track where the last cars belongs to the same block as the car under consideration, the car is humped to that classification track. If there exists a classification track with cars that on the same outbound train as the car under consideration, and no ordering constraint exists for the blocks on that track or the order constraint is satisfied and there are no other cars that are the same block to be humped in the near future as the last car on the classification track, then the classification track is selected. If none of the above criteria is satisfied, an empty classification track is selected for the car under consideration. If no classification tracks are available, then next highest train in the sorted order is selected.

A classification track 220 is assigned to each destination serviced by the selected train for a period of time prior to scheduled departure, to allow classification of car blocks that will be assigned to the train. Once a classification track is assigned to a destination, the assignment will remain either indefinitely, if a fixed class allocation strategy is in effect, or until no more cars for that destination remain in the yard inventory. Advanced strategies may also be used that anticipate additional inbound cars and retain the allocation longer, dynamically choose to release that allocation while associated cars remain in the receiving yard, allocate multiple destinations to a single classification track, e.g. geometric switching, where cuts of cars are repeatedly classified and reclassified to build multiple pure blocks on each track, or building a train in a classification track—satisfying the required standing order of an outbound train as the cars enter the bowl.

Slough tracks may be dynamically or statically allocated in more simplistic switching strategies, where the slough track receives all unassigned car destinations. A RIP (repair-in-place) track is assigned to all bad-ordered cars.

The step of pulling a car or group of cars from the classification track to the departure tracks 230 includes determining a measure of importance for each car that is ready to be pulled from the classification tracks. In one embodiment, the measure of importance is determined as a function of the time until departure of the outbound train. In another embodiment, the measure of importance is determined as a function of the order constraint of the outbound train. In yet another embodiment, the measure of importance is determined as a function of the minimum amount of time needed for the car to make an outbound connection. Once the measure of importance for each car is determined, the cumulative measure of classification track having the highest measure of importance is pulled to the departure yard first.

For each block of cars on the classification track, a departure track is selected. In one embodiment, if there is space available on a departure track where the first car belongs to the same block as the block under consideration, that departure track is selected. If not, then any empty departure track can be selected. If no empty departure tracks are available, and if there exists a departure track with blocks o cars that are on the same outbound train as the current block and there are no other cars that are of the same block to be pulled in the near future as the first block on the departure track. Otherwise, if there is no space in the departure yard, the next highest sorted classification track is selected.

Each consist assembled on the departure track must be inspected prior to departure 240. The departure trains may be sorted in increasing order of scheduled time. Beginning with the highest sorted train the amount of time need to test the train can be computed. The slack time between the expected completion of testing and the scheduled departure time can be computed. If the slack time is less than some predetermined value, a departure track that has the least amount of track space left to be tested is selected for the train.

The trains then may be departed at their scheduled time to the line of road when the testing is completed 250. If a departure lead is available, and there are trains for which scheduled departure times have passed, then the train that is most late can be selected and if all its departure tracks are tested and the length of the train on the departure tracks is greater than a predetermined minimum length, the train can be departed.

The steps identified above results in the computer-aided generation of a yard plan that provides (a) a schedule for receiving trains, (b) a schedule for inspecting cars on receiving tracks, (c) a schedule for humping cars from receiving tracks into classification tracks, (d) a schedule for pulling trains onto departure tracks, (e) a schedule for testing trains, and (f) a schedule for departing trains. The steps may be implemented in computer readable program code modules embodied in a computer usable medium for use by a general purpose or special purpose computer.

For each train in the planning horizon, the earliest scheduled outbound train is assigned a departure track for a sufficient period of time prior to scheduled departure, to allow building, inspecting and brake testing the train before departure. The assigned departure track and planned departure time is communicated to the line of road via a yard update message. When operating exceptions result in the modification of either the assigned departure track or planned departure time, additional yard update messages are sent.

Subsequent outbound trains are processed in order of scheduled departure from the yard. When a conflict occurs between two outbound trains requiring a common resource to meet their scheduled departure window, the resource allocation is adjusted to optimize the yard objective function. An alert is raised to the authorized user indicating the type of conflict and the result.

In another embodiment receiving yard allocation is managed by allocating track or tracks to each inbound train based on a set of decision rules. These decision rules may include receiving trains in the order of expected arrival, receiving trains in the order their cars are required for outbound trains, receiving trains based on their length and available room in the receiving yard, receiving trains based on outbound locomotive requirements, receiving trains based on freight priority, receiving trains based on their crews' hours of service.

A yard update message is sent to line of road dispatch system indicating the desired inbound lead for each train planned to be received from the mainline for some predetermined horizon. When receiving yard congestion is detected, an alert is raised to the authorized user. If an automatic overflow strategy is employed, a yard update message will indicate to the line of road planner the desired holding facility to which the affected train(s) must be routed. Peer-to-peer messages can be exchanged between yard planners at opposite ends of a line-of-road indicating congestion and the projected time at which the yard can accept more trains.

In order to avoid the need for backtracking in the search for optimal car movement choices, the planner must avoid several resource reservation pitfalls, such as over-subscribing classification tracks. If the number of class tracks is limited and a class track is reserved to a car destination that will not be needed for some time, the plan can suffer from class track starvation. Another example of a pitfall is pulling inappropriate receiving tracks caused by selecting a receiving track with a mix of car destinations, many of which will not be needed for some time resulting in a suboptimal allocation of classification tracks. Another pitfall is poor departure track selection, which can lead to allocating longer tracks to trains not requiring them.

In one embodiment, rules are utilized by the yard planner to recognize and avoid patterns representing these pitfalls, to insure efficient planning. Rules may also be added to recognize and recommend recovery plans, when human operators intervene and induce such patterns.

On some occasions the yard planner may not be able to generate a yard plan that meets all constraints. In such instances an exception is raised. Yard plan exceptions can be of three types—resource exceptions, productivity exceptions, and schedule exceptions. A resource exception occurs when there are insufficient resources to accomplish the objectives. A switch crew shortage and a derailment on a switch lead are examples of resource exceptions. A productivity exception occurs when the actual processing rate of a given resource is less than its processing capacity. A schedule exception occurs when the boundary constraints cannot be met. A car that arrives into the yard with less than some reasonable period of time before its scheduled departure is an example of a schedule exception.

In the process of developing a yard plan, if the yard planner detects a schedule exception, it evaluates the net impact of accelerating a car through the process to make its scheduled departure versus not doing so, and instead scheduling it to the next available train. The yard planner generates a yard plan that satisfies as many boundary constraints as possible and notifies the Yardmaster or other authorized users of the unresolved schedule exceptions. When a resource or productivity exception occurs, the yard planner notifies the Yardmaster and Trainmaster of the exception. A yard plan will not be generated until the Yardmaster or Trainmaster either resolves the exception or directs the yard planner to revise its state of the yard to reflect the impact of the exception.

The user interface of the yard planner may reside on a personal computer with some informational displays available via a thin client (e.g. web-browser, hand-held or wearable display unit). Ultimately, status and exception reporting are expected to migrate to thin-client input devices, where fully automated process monitoring is not feasible.

Interactive graphical displays may be useful to present the plan, to provide decision support, and to accept direct data input, process status reporting, and plan deviation input. Cost-effective server hardware, for example Windows XP server can host automatic plan production, external system interface management, thin-client user interface management and database management functions.

Server hardware can be deployed in a yard office environment for small yard installations, or in a climate controlled IT center for larger yards. The yard office environment is subject to much greater temperature and humidity variations that the IT center. The yard office may also subject the servers to a moderate amount of dust and dirt, certainly more so than the IT center deployment. Protective dust and dirt membranes may be required for keyboard and CPU.

Thus the present disclosure is directed to an automated yard planner that interfaces with a line of road movement planner. The movement planner sends yard update messages to the yard planner including inbound train arrival times and consist information. The mainline update (which consists of the inbound and outbound train lineups) is finalized and input into the system by the MTO or his designate. When the lineup is finalized it can be read directly by the yard planner. This information is used in conjunction with the current yard status to develop a plan for car movements for the yard. Information can be transmitted to the control terminal of the responsible individuals.

While preferred embodiments of the present invention have been described, it is understood that the embodiments described are illustrative only and the scope of the invention is to be defined solely by the appended claims when accorded a full range of equivalence, many variations and modifications naturally occurring to those of skill in the art from a perusal hereof

What is claimed:

1. A method of planning the movement of plural railcars through a rail yard, the rail yard having tracks that are used as receiving tracks, classification tracks and departure tracks and the plural railcars arriving on inbound trains and departing on outbound trains, the plural railcars required to undergo a sequence of tasks to move through the rail yard, comprising:
   (a) receiving a plurality of trains in a rail yard, each train having a plurality of railcars received on a receiving track;
   (b) for each group of railcars on a receiving track, assigning an importance value for each railcar;
   (c) aggregating the importance values of the railcars for each receiving track;
   (d) scheduling the railcars to be moved to the classification tracks as a function of the aggregated importance values of each of the receiving tracks, and
   (e) moving the railcars of the receiving track having the highest aggregated importance value to the scheduled classification tracks, before moving railcars of a receiving track having a lower aggregated value;
   wherein the importance value is determined as a function of the scheduled departure time of the railcar and the probability of the railcar to make an outbound connection.

2. The method of claim 1 wherein the importance value is determined as a function of the minimum amount of time needed for the railcar to make an outbound connection.

3. The method of claim 1 wherein the importance value is determined as a function of the probability of the railcar to make an outbound connection.

4. The method of claim 1 wherein the step of scheduling includes sorting the receiving tracks in decreasing order of priority as a function of the aggregated importance values of the railcars on the respective receiving tracks.

5. The method of claim 4 wherein the step of scheduling further includes selecting the highest sorted receiving track for which there is capacity available on a classification track.

6. The method of claim 1 further comprising selecting a classification track for a car on the receiving track as a function of the space available on a first classification track and the last car on the first classification track.

7. The method of claim 6 including selecting the first classification track if there is space available and the last car on the first classification track belongs to the same block as the car on the receiving track under consideration.

8. A method of planning the movement of plural railcars through a rail yard, the rail yard having tracks that are used as receiving tracks, classification tracks and departure tracks and the plural railcars arriving on inbound trains and departing on outbound trains, the plural railcars required to undergo a sequence of tasks to move through the rail yard, comprising:
   (a) identifying the outbound trains scheduled to depart the yard during a predetermined planning horizon;
   (b) identifying candidate railcars for each identified outbound train;
   (c) determining the business objective value of each identified candidate railcar;
   (d) ranking the identified candidate cars in decreasing order based on business objective values; and
   (e) selecting an identified candidate railcar for inclusion in an identified outbound train in order of the ranking of the candidate cars;
   wherein the step of raking includes:
   (i) determining the current availability of each identified candidate railcar;
   (ii) determining the probability of the candidate railcar to be ready for a departure of the identified outbound train as a function of the determined availability;
   (iii) weighting the business objective values of the railcar as a function of the determined probability of the railcar;
   (iv) aggregating the business objective values of the railcars for each receiving track;
   (v) scheduling the railcars to be moved to the classification tracks as a function of the aggregated business objective values of each of the receiving tracks; and
   (vi) moving the railcars of the receiving track having the highest aggregated business objective value to the scheduled classification tracks, before moving railcars of a receiving track having a lower aggregated business objective value.

9. The method of claim 8 further comprising:
   (f) identifying a sequence of tasks to prepare the selected candidate railcar for inclusion in an identified train; and
   (g) assigning resources to perform the identified sequence of tasks as a function of the business objective value of the selected railcar.

10. The method of claim 9 wherein the business objective value is determined as a function of a physical characteristic of the identified outbound train.

11. The method of claim 10 wherein the physical characteristics is at least one of length, weight, or order of the railcars in the train.

12. The method of claim 9 wherein the business objective value is a function of yard operating rules.

13. The method of claim 9 wherein the business objective value is a function of the yard operating costs.

14. The method of claim 8 wherein the step of determining the probability is a function of historical performance of railcars.

15. The method of claim 8 wherein the probability is determined using a time based modulation function.

16. The method of claim 15 wherein the time based modulation function considers one of time of day and time of season.

17. The method of claim 8 wherein the probability is determined using a load based modulation function.

18. The method of claim 8 wherein the probability is determined as a function of a moving average of the historical performance of the railcar.

19. A method of planning the movement of plural railcars through a rail yard having a plurality of tracks used as receiving tracks, classification tracks and departure tracks, the method comprising:
   (a) receiving a plurality of trains in a rail yard, each train having a plurality of railcars received on a receiving track;
   (b) for each group of railcars on a receiving track, assigning an importance value for each railcar;
   (c) aggregating the importance values of the railcars for each receiving track;
   (d) scheduling the railcars to be moved to the classification tracks as a function of an ordered priority of the aggregated importance values and
   (e) moving the railcars of the receiving track having the highest aggregated importance value to the scheduled classification tracks, before moving railcars of a receiving track having a lower aggregated importance value;
   wherein the importance value is determined as a function of the scheduled departure time of the railcar and the probability of the railcar to make an outbound connection.

20. The method of claim 19 wherein the probability is determined as a function of historical performance of railcars.

21. The method of claim 19 wherein the probability is determined using a time based modulation function.

22. The method of claim 21 wherein the time based modulation function considers one of time of day and time of season.

23. The method of claim 19 wherein the probability is determined using a load based modulation function.

24. The method of claim 20 wherein the probability is determined as a function of a moving average of the historical performance of the railcar.

* * * * *